Aug. 12, 1958 — M. M. COKER — 2,846,848
FLUID PRESSURE SYSTEM AND CONTROL
Filed May 16, 1955 — 2 Sheets-Sheet 1
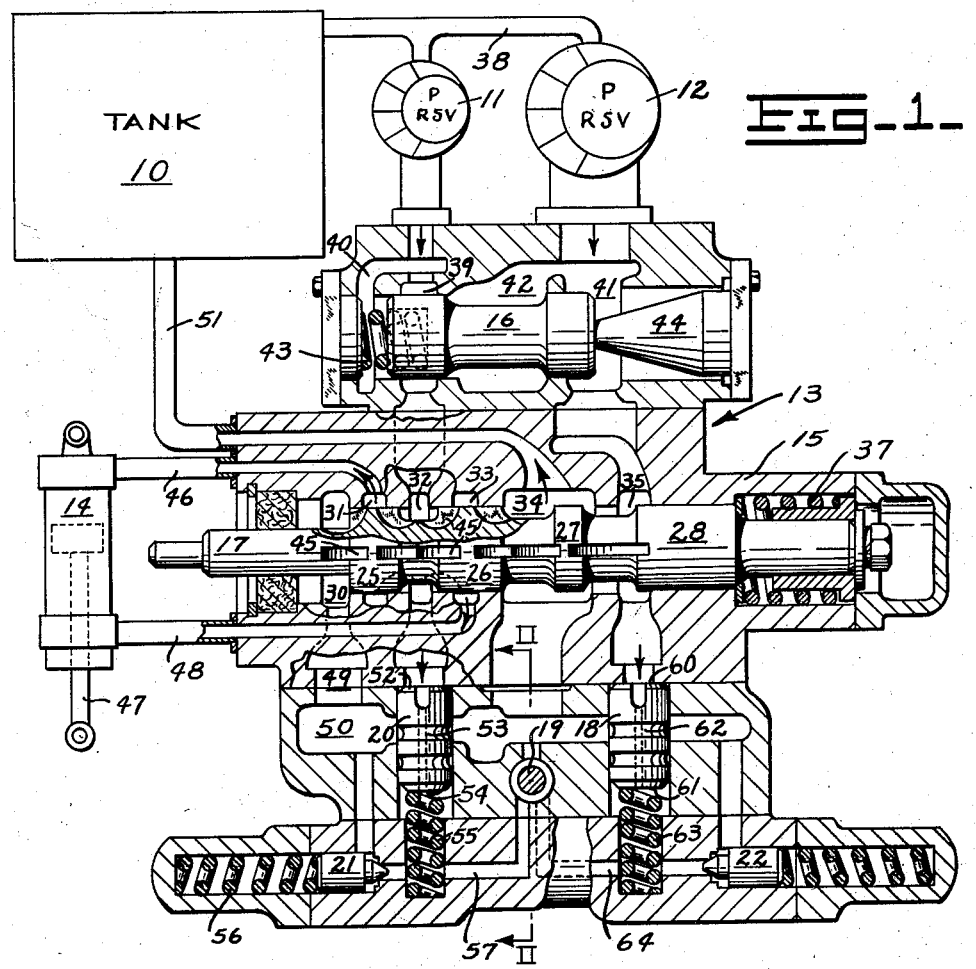
Fig-1-
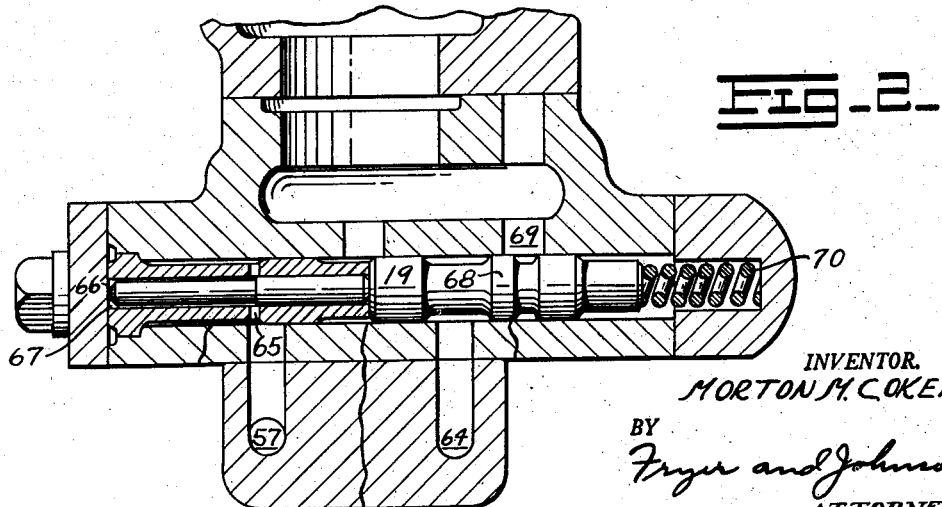
Fig-2-
INVENTOR.
MORTON M. COKER
BY
Fryer and Johnson
ATTORNEYS Aug. 12, 1958  M. M. COKER  2,846,848
FLUID PRESSURE SYSTEM AND CONTROL
Filed May 16, 1955  2 Sheets-Sheet 2
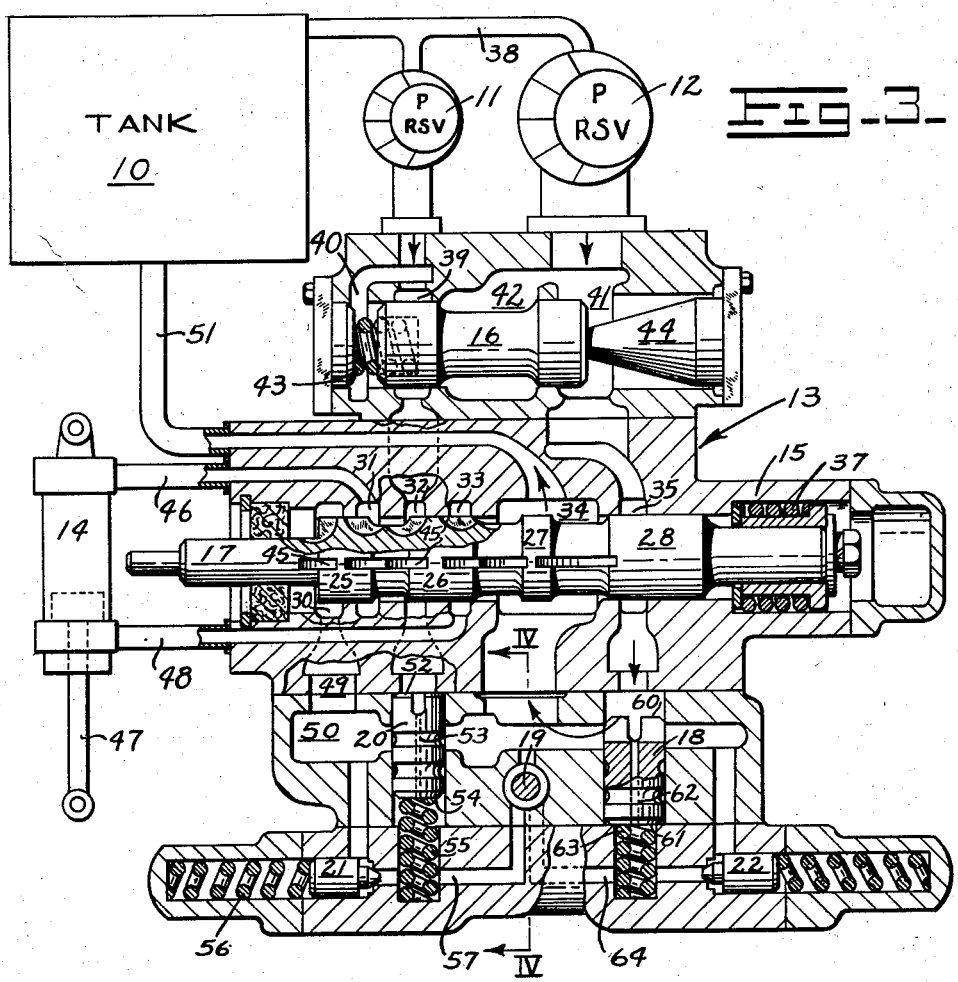
Fig-3-
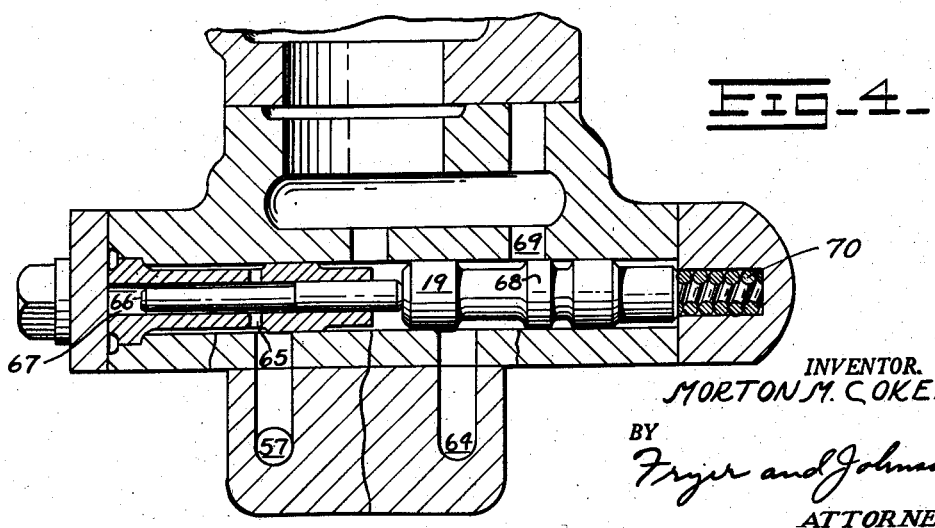
Fig-4-
INVENTOR.
MORTON M. COKER
BY
Fryer and Johnson
ATTORNEYS

United States Patent Office 2,846,848
Patented Aug. 12, 1958

2,846,848

FLUID PRESSURE SYSTEM AND CONTROL

Morton M. Coker, Peoria, Ill., assignor to Caterpillar Tractor Co., Peoria, Ill., a corporation of California Application May 16, 1955, Serial No. 508,692

2 Claims. (Cl. 60—52)

This invention relates to fluid pressure systems which employ two positive displacement pumps of different volumetric capacities and particularly to fluid flow and pressure control means therefor.

The invention is particularly adaptable to and may best be understood in connection with its use in hydraulic steering mechanisms of the kind found on large tractors and the like. One such mechanism, for example, is that disclosed in the patent to Gustafson, No. 2,614,644, for "Tractor Steering Mechanism." This patent shows steering by hydraulic jacks or servomotors receiving fluid under pressure from a system which includes two jumps. One pump is larger than the other, and a selector valve actuated by movement of a steering wheel directs the output of the small pump only to the jacks or servomotor normally permitting the output of the large pump to dump or return freely to the reservoir or source. Upon abrupt turning of the steering wheel, calling for more fluid than the output of the small pump, the selector valve serves to direct the output of the large pump into the circuit which leads to the servomotor. One difficulty that is encountered in this type of operation is that the large pump remains connected with this circuit after the servomotor has attained its limit of movement as, for example, when the wheels of the vehicle are held in a fully turned or cramped position. Under such conditions, the large pump is needlessly operating against a high back pressure, causing a high rate of wear on the pump parts and wasting power which is dissipated in excessive heat. The present invention provides means operable when the large pump is in use and when the servomotor has reached the limit of its movement to discharge or dump the output of the large pump, thus relieving it of unnecessary work and stresses, and permitting the small pump to supply the pressure necessary to hold the servomotor in the desired position.

The object of this invention is to provide a compact control valve unit in combination with a two-pump fluid pressure system which will permit selective rates of flow to a servomotor and will provide for automatic unloading of the larger pump upon a predetermined pressure being reached and maintained on the operating side of the servomotor. More specifically, the invention provides in a fluid pressure system the combination of two positive displacement pumps and a fluid flow and pressure control valve unit, which includes a check valve to permit combining the output of the larger pump with the output of the smaller pump, a selector valve to direct either the output of the smaller pump or the output of both pumps to a servomotor, a pilot-operated relief valve in the circuit communicating with the operating side of the servomotor, and a pilot-operated unloading valve in the discharge circuit of the larger pump having its pilot valve remotely controlled in response to pressure in the operating circuit of the servomotor.

In the drawings:

Fig. 1 is a schematic view of the fluid pressure system showing a servomotor in a partially extended position and a cross-sectional view of the control valve unit showing the selector valve spool in a neutral position;

Fig. 2 is a sectional view taken in a plane indicated by line II—II of Fig. 1 showing the remotely controlled pilot valve in a closed position;

Fig. 3 is like Fig. 1 with the selector valve spool shown in a position to direct the output of both sources of supply to the servomotor upon operation of a flow combining check valve and the unloading valve of the larger pump is shown in an open position; and Fig. 4 is a cross-sectional view taken in a plane indicated by line IV—IV of Fig. 3 and showing the remotely controlled pilot valve in an open position.

In Fig. 1, the fluid pressure system is shown as comprising a reservoir tank 10 as a source of fluid supply, two rotary sliding-vane pumps including a small pump 11 and a larger pump 12, a control valve unit 13, a fluid-pressure operated servomotor 14, and suitable fluid transmitting conduits connecting these elements.

The control valve unit 13 includes a valve body 15, a flow-combining check valve 16, a flow-directing selector valve spool 17, an unloading valve 18 in the pressure circuit of the larger pump 12, a remotely controlled pilot valve 19 which determines the opening of unloading valve 18, a pilot operated relief valve 20 in the circuit of the smaller pump 11, and a pilot valve 21 controlling the opening of the relief valve 20. The system may also include a safety pilot valve 22 which will cause the unloading valve 18 to function as a relief valve in case of a failure of the remotely controlled pilot valve 19.

The selector valve spool 17 is provided with a plurality of lands 25, 26, 27, and 28 which cooperate with recesses 30, 31, 32, 33, 34 and 35 formed in the bore of the valve body 15 to effect the desired direction of the fluid. A spring 37 is associated with one end of the valve spool 17 to urge the valve to the neutral position shown in Fig. 1.

Fluid from the reservoir 10 is admitted to the pumps 11 and 12 by means of a branched inlet pipe 38, and is directed from the smaller pump 11 to the recess 32 in the valve bore by way of an annular recess 39, and also is directed to a channel 40 behind the check valve 16, while fluid from the larger pump 12 is directed to recess 35 by way of channel 41 at the opposite end of the check valve and also into chamber 42. A spring 43, assisted by the fluid under pressure in channel 40, normally holds the check valve 16 in the closed position as shown against a stop 44, and prevents the fluid in channel 41 and chamber 42 from forcing the check valve to the left to an open position.

With the valve spool 17 in the neutral position illustrated in Fig. 1, the check valve 16 will remain closed, as shown, and fluid from the small pump 11 flows from recess 32 into annular recess 31 through a number of radially spaced notches 45 in land 25 and is directed to a conduit 46 which tends to extend the piston rod 47 of the servomotor 14. At the same time, fluid from recess 32 flows into annular recess 33 through radially spaced notches 45 in land 26 and is directed to a conduit 48 which tends to retract the piston rod 47 into the servomotor. Thus, a nominal pressure is maintained at both ends of the servomotor while the selector valve 17 is in a neutral position. The excess fluid delivered to recess 31 is returned to the reservoir through notches 45 in land 25, to recess 30, and thence through a port 49 to a return manifold 50. The return manifold 50 communicates with the recess 34, and return flow is directed through this recess to the source of supply 10 by means of a conduit 51. The excess fluid delivered to recess 33 is returned to the reservoir through notches 45 in land 26 by way of recess 34 and conduit 51.

To effect a slow rate of extension of the servomotor, the valve spool 17 is moved an appropriate distance to the left (as viewed in Fig. 1) by any suitable means such as steering mechanism of a vehicle (not shown) to prevent communication of recess 31 with recess 33 and direct all of the fluid from pump 11 through conduit 46 to the operating, or pressure side of the servomotor. As the piston rod 47 is extended, fluid is returned to the reservoir through conduit 48, notches 45 in land 26, to recess 34 and through return line 51. To effect a slow rate of retraction of the servomotor, the valve spool is moved a slight distance to the right of neutral, thereby closing communication between recess 33 and return recess 34 and establishing conduit 48 as the operating, or pressure, side of the servomotor and conduit 46 as the return side in conjunction with recess 30, port 49, return manifold 50, recess 34, and conduit 51.

The fluid pressure in recess 32 and the pressure in the servomotor is transmitted to a face 52 of relief valve 20. A bore 53 in the valve 20 allows the fluid pressure to be exerted against a face 54 to balance the valve. A light biasing spring 55 assures closing of the relief valve 20 so long as a spring 56 holds the pilot valve 21 in the closed position against the pressure in channel 57. Whenever the pressure in the operating circuit of the servomotor, and recess 32 which supplies the circuit, exceeds the force of spring 56, the pilot valve 21 will open and unbalance the relief valve 20 to open recess 32 to the return manifold 50 and return the excess fluid to the reservoir.

While the selector valve spool 17 is in a neutral position, or disposed a slight distance to the left, or to the right, of neutral to effect a slow rate of movement of the servomotor, all of the fluid discharged from the larger pump 12 is returned to the tank at substantially no pressure by way of channel 41, through recess 35, past land 27, into return recess 34 and line 51.

Should a faster rate of movement of the servomotor be desired, the selector valve spool 17 is moved to an extreme left, or right, position. In Fig. 3, the valve spool is shown in an extreme left position and the servomotor fully extended. Assuming that the selector valve spool is first moved to an extreme left position before the servomotor has reached the limit of its travel, the land 28 will close communication between the annular recess 35 and the return recess 34 and prevent return of the fluid from pump 12 to the tank. Upon movement of spool 17 to the right, the land 27 will block passage 35 to recess 34, and the operation to be described will be the same as will be understood from the following. This fluid in recess 35 is directed against a pressure face 60 of the unloading valve 18 and also against face 61 on the opposite end of the valve by way of a bore 62. Thus, valve 18 is in a balanced condition similar to relief valve 20. A light spring 63 is provided to return the valve to the closed position shown in Fig. 1. The pressure at faces 60 and 61 is also transmitted to the pilot valve 19 by means of a channel 64. If a spring pressed safety pilot valve 22 is provided, the fluid under pressure may be directed to this safety pilot valve by a branch of channel 64, as shown. Since the fluid from pump 12 can now escape recess 35 only through valves 16 or 18 and it is desirable at this point to combine the output flow of the larger pump with the output of the smaller pump, the valve 16 is designed to open before valve 18 under these conditions. Consequently, the pressure in recess 35 and channel 41 moves valve 16 to the left and directs the output of both pumps to recess 32 and thence to the operating side of the servomotor.

As soon as the servomotor 14 has been fully extended, as shown in Fig. 3, pressure in the operating circuit of the servomotor (line 46) will also be present in recess 32 and channel 57 to be directed against the relief pilot valve 21 and the remotely controlled unloader pilot valve 19 by way of an orifice 65 (Fig. 4) to a pressure face 66 in a pressure chamber 67. The pilot valve 19 is shown in a closed position in Fig. 2. The pressure in the servomotor operating circuit will also be present in recess 35 and consequently channel 64; however, the safety relief pilot valve 22 and a land 68 closing exhaust port 69 prevent escape of the fluid and any reduction in pressure until a predetermined pressure is reached and maintained in the operating circuit of servomotor 14.

It is desirable to maintain the pressure in the operating circuit while at the same time unloading the large pump to prevent excessive heating of the fluid, wearing of the pump 12, and wasting of horsepower used to rotate this pump. Therefore, a biasing spring 70 which normally holds the unloader pilot valve in a closed position is designed to permit movement of valve 19 to an open position (to the right as viewed in Figs. 2 and 4) at a lower pressure than is required to open the relief pilot valve 21, or the safety pilot valve 22. For example, the unloader pilot valve 19 may be designed to open at a pressure of 850 p. s. i., the safety relief pilot 22 may be dimensioned to open at 925 p. s. i., and the relief pilot 21 may be set to open at 1000 p. s. i. Consequently, when a fluid pressure of 850 p. s. i. is reached in the operating circuit, the unloader pilot 19 will be opened, as shown in Fig. 4, causing a pressure drop in channel 64 and the opening of the unloader valve 18 as shown in Fig. 3. As soon as valve 18 is opened, a decrease in pressure in recess 35 and chamber 42 will result, thus permitting check valve 16 to return to the closed position. As the fluid pressure in the operating circuit rises to 1000 p. s. i., relief pilot 21 will open, causing a lower pressure in channel 57 than at face 52, and relief valve 20 will open a sufficient distance to relieve the operating circuit of any fluid pressure in excess of 1000 p. s. i. Thus, control valve unit 13 will permit selective slow or fast rates of movement of servomotor 14 while providing for automatic unloading of pump 12 upon a predetermined pressure being reached and maintained in the operating circuit of the servomotor. Should the remotely controlled unloader pilot 19 fail to function, the safety relief pilot 22 will open at 925 p. s. i. to cause valve 18 to function as a relief valve at this pressure.

There is a brief time delay between the movement of the selector valve spool 17, as land 28 closes communication between recess 35 and return recess 34, and the movement of check valve 16, by the pressure in chamber 41. If the pump 11 is directing pressure to the servomotor and to chamber 40 behind the check valve when the selector valve is moved, the pressure in chamber 40 will result in an extremely high pressure in the circuit of the large pump for a short period of time, perhaps 1/50 of a second, before the check valve 16 is opened. During a pressure surge occurring under these conditions, the safety pilot 22 will open and reduce the pressure in channel 64 to cause the unloader valve 18 to function as a relief valve for the large pump.

I claim:

1. A fluid pressure system comprising a source of fluid supply, a fluid operated servomotor, two positive displacement pumps having different volumetric capacities, a fluid flow and pressure control valve unit, and fluid transmitting conduits between the source of supply, the pumps, the control valve unit, and the servomotor, the said fluid flow and pressure control valve comprising a valve body, an inlet channel communicating with the discharge side of the smaller pump, an inlet channel communicating with the discharge side of the larger pump, means to establish communication between said inlet channels, a valve spool in a valve bore to selectively direct the fluid output of the smaller pump or the combined fluid output of both pumps to the servomotor, a relief valve in the operating circuit of the servomotor, a pilot operated unloader valve in the discharge circuit of the larger pump, and a pilot valve controlling the action of said unloader valve and responsive to fluid pressure in the operating circuit of the servomotor.

2. A fluid pressure system comprising a source of fluid supply, a fluid operated servomotor, two positive displacement pumps having different volumetric capacities, a fluid flow and pressure control valve unit, and fluid transmitting conduits between the source of supply, the pumps, the control valve unit, and the servomotor, the said fluid flow and pressure control valve comprising a valve body, an inlet channel communicating with the discharge side of the smaller pump, an inlet channel communicating with the discharge side of the larger pump, means to establish communication between said inlet channels, a valve spool in a valve bore in the body to selectively direct the fluid output of the smaller pump or the combined fluid output of both pumps to the servomotor, a relief valve in the operating circuit of the servomotor, a pilot operated unloader valve in the discharge circuit of the larger pump, a pilot valve controlling the action of said unloader valve and responsive to fluid pressure in the operating circuit of the servomotor, and a relief pilot valve in the circuit of the larger pump controlling the action of said unloader valve.

References Cited in the file of this patent

UNITED STATES PATENTS

| | | |
|---|---|---|
| 1,982,711 | Vickers | Dec. 4, 1934 |
| 2,301,225 | Muller | Nov. 10, 1942 |
| 2,614,644 | Gustafson | Oct. 21, 1952 |
| 2,624,283 | Hirvonen | Jan. 6, 1953 |
| 2,659,204 | Conway et al. | Nov. 17, 1953 |